3,098,753
PORCELAIN ENAMELING FRIT
Harry J. Van Dolah, Wheaton, and Otto C. Linhart, Cicero, Ill., assignors to Eagle Picher Company, Cincinnati, Ohio, a corporation of Ohio
No Drawing. Filed Nov. 20, 1961, Ser. No. 153,701
2 Claims. (Cl. 106—48)

The present invention relates to an improved frit composition for porcelain enamels and to a method of applying enameling compositions including such frits to metallic surfaces.

The subject matter of the present invention has particular utility in connection with the manufacture of glass lined hot water tanks. Not only must such linings exhibit excellent bonding to the underlying metal, and also substantial strength, they must above all be highly resistant to both conditions of high acidity and high alkalinity.

Heretofore, enameling frits which have been employed in the manufacture of glass lined hot water tanks have been milled so that approximately 5 to 10% was retained on a 200 mesh screen. Milling to a finer degree was not considered desirable because such frits, commonly contained substantial quantities of boric oxide ($B_2O_3$) which, in the finer particle sizes was too soluble in the glass composition. This excessive solubility results in what is known as "tearing," a rupturing of the enamel in the dried bisque. Upon firing, this rupturing was only partly healed, but left lines in the enamel which gave rise to excessive attack by acid or alkaline agents.

We have now found that the problems associated with frit compositions used in glasses for the lining of hot water tanks and similar objects can be made with little or no boron trioxide by a suitable adjustment of the other ingredients in the composition. Not only does this diminution of the boron trioxide remove the tearing problem but it also significantly increases the resistance of the coating to both acid and alkali solutions, as well as permitting the firing to be accomplished at substantially lower temperatures than heretofore employed, since the limitation of particle sizes is no longer present.

Accordingly, an object of the present invention is to provide an improved porcelain enameling frit for application to objects which require substantial acid and alkali resistance.

A further object of the present invention is to provide an improved porcelain enameling frit which reduces or entirely eliminates the boron trioxide content presently employed in such frits.

Still another object of the invention is to provide a porcelain enameling composition which can be applied at lower temperatures than heretofore have been employed.

A still further object of the invention is to provide a porcelain enameling frit which can be used in very finely divided particle size without detrimental effect upon the coating produced.

A further object of the present invention is to provide a new method for the application of porcelain enameling frits to objects to be coated.

The porcelain enameling compositions of the present invention can be used in direct application to metal, as an overspray over a dried ground coat bisque, or as a full second coat. The broad range of ingredients which we have found to be applicable is given in the following table:

*Table I*

| | Percent by weight |
|---|---|
| $SiO_2$ | 40–80 |
| $Na_2O$ | 10–20 |
| $B_2O_3$ | 0–5 |
| $F_2$ | 0–14 |
| $ZrO_2$ | 0–10 |
| $V_2O_5$ | 0–10 |
| $CaO$ | 0–10 |
| $Li_2O$ | 0–5 |
| $TiO_2$ | 0–10 |
| $Fe_2O_3$ | 0–5 |
| $Al_2O_3$ | 0–5 |
| $CoO$ | 0–2 |
| $NiO$ | 0–2 |
| $MnO$ | 0–10 |
| $Mo_2O_3$ | 0–10 |
| $BaO$ | 0–12 |

Within the broader ranges expressed above, a particularly preferred composition has the following composition:

*Table II*

| | Percent by weight |
|---|---|
| $SiO_2$ | 55–65 |
| $Na_2O$ | 12–15 |
| $F_2$ | 4–8 |
| $ZrO_2$ | 5–8 |
| $V_2O_5$ | 0–5 |
| $Li_2O$ | 1–4 |
| $BaO$ | 0–7 |
| $TiO_2$ | 2–9 |
| $Mo_2O_3$ | 1–5 |
| $CoO$ | 1–2 |
| $MnO$ | 0.5–5 |

The vanadium oxide is found to improve the acid resistance of the glass, while cobalt oxide and nickel oxide are added for better adherence, and better chemical resistance. Molybdenum trioxide improves the adherence, as well as serving as a flux. The same is true of the manganese oxide. Basically, the acid resistance comes from the ingredients such as the vanadium oxide and the titanium, while the alkali resistance comes from the zirconia and the alumina, when used.

The frit can be made up by conventional techniques and combined with normal mill additions to form a coating composition which can be applied by spraying or flow coating the material onto hot rolled, cold rolled, or enameling grade steel where the surface has been suitably prepared by sand blasting, shot blasting, and/or acid pickling with or without a nickel deposit. Because of the substantial elimination of boron trioxide in the composition, the mill formula can be ground to a particle size such that no more than about 15% is retained on a 325 mesh screen.

The firing temperatures of the compositions of the present invention range from about 1550° F. to about 1650° F., when applied to a substrate measuring from 11 to 14 gauge, typical of the type of stock used in the manufacture of hot water tanks. The total thickness of the enamel coating is desirably in the range of about 6 to 7 mils after firing.

The following examples illustrate more specifically the manner of preparing the composition, and its application to the surface to be coated.

Frit compositions were made up with the following analyses:

Table III

|  | A, percent by weight | B, percent by weight |
|---|---|---|
| $SiO_2$ | 60.00 | 60.00 |
| $Na_2O$ | 13.00 | 13.00 |
| $F_2$ | 6.90 | 6.90 |
| $ZrO_2$ | 7.00 | 7.00 |
| $V_2O_5$ | 3.00 | 0.00 |
| BaO | 0.00 | 3.00 |
| $Li_2O$ | 2.00 | 2.00 |
| $TiO_2$ | 7.00 | 7.00 |
| $Mo_2O_3$ | 2.00 | 2.00 |
| CoO | 1.50 | 1.50 |
| MnO | 0.50 | 0.50 |
|  | 102.90 | 102.90 |
| Less $O_2$ for $F_2$ | −2.90 | −2.90 |
|  | 100.00 | 100.00 |

Either of the smelted frits can be milled in a porcelain ball grinding mill with mill additions as follows:

Table IV

| | Parts by weight |
|---|---|
| Frit | 100 |
| Clay | 7 |
| Silica | 10 |
| Borax | 5/8 |
| Magnesium carbonate | 1/16 |
| Potassium nitrite | 1/32 |
| Water | 40 |

The final mixture had a particle size such that substantially all passed through 325 mesh screen.

The enamel was applied by the normal wet process to a piece of 11 gauge steel and fired at approximately 1580° F. for eight minutes. The coating which resulted had a thickness of about 6 to 7 mils.

The chemical resistance of the enameled article was checked by exposing samples to boiling 10% hydrochloric acid and boiling 10% sodium hydroxide. The samples lost an average of only about 1 milligram per square inch for a five hour test.

From the foregoing it will be seen that the frit compositions of the present invention provide a glass which is "harder" with respect to its ability to resist corrosion by acid and alkali, while being "softer" with respect to the severity of processing conditions.

It should be evident that various modifications can be made to the described embodiments. For example, at least part of the sodium oxide can be replaced by potassium oxide. It is therefore not our intention to limit the subject matter of the present invention to the specific examples described, but only necessitated by the scope of the following claims.

We claim as our invention:

1. A porcelain enameling frit consisting essentially of:

| | Percent by weight |
|---|---|
| $SiO_2$ | 55–65 |
| $Na_2O$ | 12–15 |
| $F_2$ | 4–8 |
| $ZrO_2$ | 5–8 |
| $V_2O_5$ | 0–5 |
| $Li_2O$ | 1–4 |
| $TiO_2$ | 2–9 |
| $Mo_2O_3$ | 1–5 |
| CoO | 1–2 |
| MnO | 0.5–5 |
| BaO | 0–7 |

2. The porcelain enameling frit composition of claim 1 having a particle size such that not more than about 15% is retained on a 325 mesh screen.

References Cited in the file of this patent
UNITED STATES PATENTS

| 2,010,776 | Frost | Aug. 6, 1935 |
| 2,332,424 | Zwermann | Oct. 19, 1943 |
| 2,347,187 | Frost | Apr. 25, 1944 |
| 2,604,410 | Bryant | July 22, 1952 |
| 2,890,964 | Commons et al. | June 16, 1959 |
| 2,014,816 | King et al. | Dec. 26, 1961 |